UNITED STATES PATENT OFFICE.

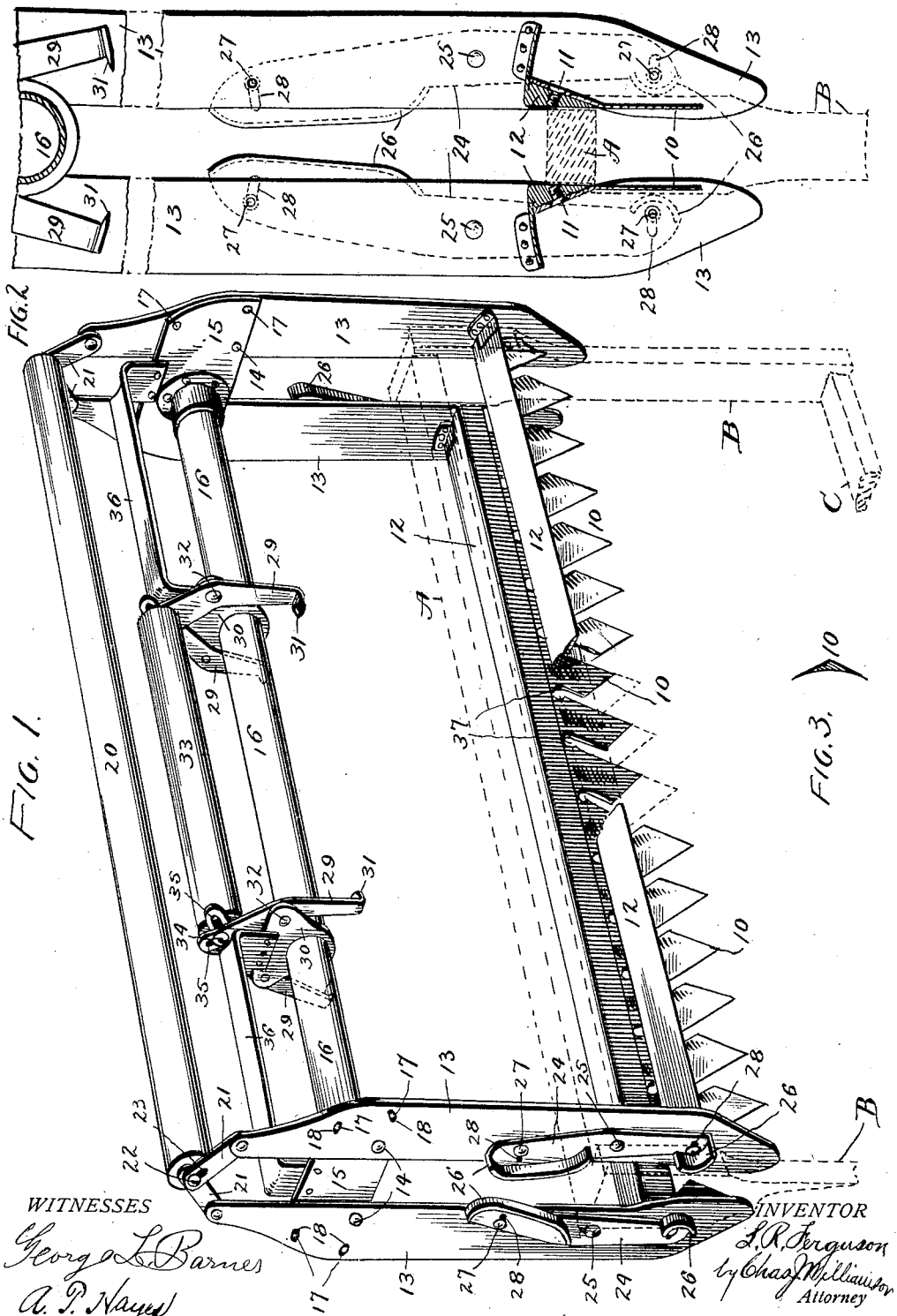

LEWIS R. FERGUSON, OF HARVEY, ILLINOIS.

HONEY-UNCAPPING MACHINE.

1,084,141.   Specification of Letters Patent.   Patented Jan. 13, 1914.

Application filed April 3, 1913. Serial No. 758,729.

*To all whom it may concern:*

Be it known that I, LEWIS R. FERGUSON, of Harvey, in the county of Cook, and in the State of Illinois, have invented a certain new and useful Improvement in Honey-Uncapping Machines, and do hereby declare that the following is a full, clear, and exact description thereof.

Briefly described my machine comprises two parallel series of knives, each carried by a laterally swinging frame, and which are moved downward over the honey frame with a series of knives at each side thereof so that cappings on both sides will be simultaneously sliced off by the downward travel of the knives, and in order to save handling this operation is performed while the comb frames are still in the hive, but with the bottom removed, so that the sheets of cappings as they are sliced off may fall through the bottom and into a suitable receptacle.

In the accompanying drawings—Figure 1 is a perspective view of a machine embodying my invention, a portion of a comb frame being shown in dotted lines, and a part of the near knife-carrying bar being broken away; Fig. 2 is a detail view in vertical section, a portion of a honey frame being shown in dotted lines; and Fig. 3 is a detail view in horizontal section through one of the knives.

The knives 10, as I prefer to make them, are in the form of a pointed two edged blade through the shank of which a screw 11 passes for attachment to a horizontal supporting bar 12, which at its ends is rigidly attached to similar very thin vertical bars or plates 13, each of which near its upper end is pivoted by a pin or rivet 14 to one of two end plates 15 rigidly connected together by a horizontal pipe-form or tubular bar 16, said end plates and said bar thus constituting a frame structure to which each knife-carrying frame is pivoted or hinged, so that two series of knives may be moved toward and from each other or inward with reference to the comb frame, and outward with reference thereto. Each knife-carrying bar 12 at its upper end is turned outward and downward, being preferably concave on its underside so as to constitute a deflector for the sheet of cappings, and such formation stiffens the knife bar. The laterally swinging movement of the knife-carrying frames is limited by providing one or more pins 17 that project from the end plate 15 through slots 18 in the end bars 13. The upper ends of the end bars 13 of the knife-carrying frames above their pivots 14 are connected to a pipe-form or tubular horizontal bar 20 that extends parallel with the frame-forming bar 16, the pair of end bars 13 at the same end being connected to the end of the bar 20 by a pair of links 21 pivoted to the respective end bars 13 and inclining or converging upward where they are pivotally connected to the end of the bar 20 by means of a pin or screw 22 that passes through holes 23 in each of said links 21. The bar 20 constitutes a handle, and it will be seen that by a lifting movement thereon the two knife-carrying frames at their lower ends will be swung away from each other, while by pressing downward thereon, as in the act of forcing the machine downward in an uncapping operation, the lower knife-carrying portions of the two frames will be moved inward and the knives thus pressed in toward the opposite sides of the honey comb to assure the proper cutting thereof by the knives.

As may be seen by reference to Fig. 2, the lower ends of the end bars or plates 13 extend below the knives and the inner edges of each of said end bars or plates 13 are in a plane within the plane of the knives, the purpose of this arrangement being to prevent the knives catching on the top bar A of the comb frame when the knives are moved downward and until they pass the top bar A, and the plane of the inner edges of the end bars 13 above the knives is carried outward so that the points of the knives, after passing the upper bar A may properly enter the comb to cut the caps therefrom. The inner edges of the end bars 13 lie alongside of the inner sides of the end bars B of the comb frame.

To guide the machine during a cutting operation so that the knives will pass properly downward through the comb and past the bottom bar C of the comb frame, I mount on the outer side of each end plate or bar 13 a rocking arm 24 pivoted by a rivet or pin 25 between its ends to the end bar 13 and above and below the pivot 25, said rocking arm has outwardly projecting flanges 26 which engage the edges of the comb frame end bars B. The comb frame shown in the drawings, and for which the machine is especially adapted, is of the Hoffman type, where the end bars B are wider at the top than for the remainder of their length, and for that reason the rocking guide-carrying arm is provided to enable the guide flanges 26 to properly follow the irregular form of the edges of the end bars B. The rocking arms 24 have their rocking movement limited by rivets or pins 27 that pass through slots 28 in the arms into the end bars or plates 13.

To enable a comb frame, after the machine has passed downward thereover and removed the cappings, readily to be lifted out of the hive, I provide a comb frame-engaging grip which consists of two pairs of levers 29 pivoted intermediate their ends to plates 30 mounted on the frame bar 16, which levers 29 at their lower ends have teeth 31 adapted, when the lower ends of the levers are moved inward toward each other, to engage the top bar A of the comb frame, and to move said levers 29 inward to engage the top bar of the comb frame, and outward to free the bar, the levers above their pivots 32 are pivotally and slidably connected to a handle bar 33 lying between the frame bar 16 and the handle bar 20, such connection consisting of a pin or screw 34 that passes through slots 35 in overlapping portions of the levers 29 and into the end of the handle 33. An upward movement of the handle 33 causes the tooth-carrying lower ends of the levers 29 to move inward and grip the top bar A of the comb frame while a downward movement of the handle 33 swings the tooth-carrying ends of the levers 29 out of engagement with said top bar A. It will be observed that the handle 33 is situated so that the fingers of the hand that grip the handle 20 may readily reach the handle 33 and the grip transferred from the handle 33 to the handle 20 when it is desired to free the levers 29 from the top bar A. The plates 32 to which the levers 29 are pivoted, are braced or stiffened by horizontal bars 36 which at one end are riveted to the plates 32 and at their opposite ends are riveted to the end plates 15, and each bar 36 constitutes a grip handle so that in operating the machine it may be caught at both ends by the hands with the fingers passing under the grip handles 36.

The knives that I prefer to use are dished or concave on their sides next to the comb to prevent any suction action and to avoid friction, and as their cutting edges are inclined they work with a draw or shear cut with the result that the effort required to cut the cappings is not great and the cappings are most cleanly and advantageously removed, they being removed as a sheet, and thus danger of pieces of wax getting into the honey obviated. I prefer that each knife shall have two cutting edges, but if desired knives with only one cutting edge may be employed. When knives with two cutting edges are employed, one cutting edge is shorter than the other and the knives are arranged as clearly shown in Fig. 1, so that the long edge of one knife and the short edge of adjacent knife are contiguous and extend in lines that intersect, so that they overlap the same portion of the comb in a cutting operation and a slight space is left between the edges of the two contiguous knives above the point of termination of the short cutting edge which is enlarged by a notch 37 contiguous to the shank of the knife so that escape between the knives is permitted of any loose particles of wax which may work upward.

The manner of using my machine it is thought will be readily understood from the description which has now been given.

The machine held by the hands gripping the handles 20 and 36 is moved downward, the lower ends of the end plates or bars 13 first striking the top bar A of the comb frame and swinging sufficiently therefrom to prevent the knives striking the top bar, and as soon as the knives pass below the top bar by the downward pressure upon the handle 20 and the upward pull on the handles 36, the knives are promptly moved inward so that their points enter the comb beneath the caps and the downward movement continuing, the machine being guided by engagement of the guide flanges 26 with the edges of the end bars B, the cappings on both sides of the comb will be sliced off and fall into a suitable receptacle. The cappings being engaged by the outwardly and downwardly turned flanges of the knife bars 12 will be deflected outward and turned downward through the bottom of the hive. The levers 29 by the time of the complete severance of the cappings have their toothed lower ends in position to engage the top bar A, may be rocked by an upward pull on the handle 33 to bite into the top bar A and the uncapped comb can then be readily lifted from the hive, if the operation has been performed in the hive. When the machine is disengaged from the frame and lifted therefrom, the upward pull on the handle 20 or the weight of the parts suspended from the handle 20 will cause the knife-carrying frames to swing outward so that in passing upward the knives will move laterally out of contact with the uncapped contents of the frame.

As practically all the parts of the machine can be made of sheet metal, including the tubular members, the machine is light in weight and is inexpensive to manufacture, and yet it has all required strength for the most effective performance of its work.

Having thus described my invention what I claim is—

1. In a honey uncapping machine, the combination of a support, a pair of knife-carrying frames movably connected with said support each of said frames comprising vertical end bars and a horizontal knife-carrying bar extending between and connecting said end bars, comb-frame-engaging guides mounted on said frames, and means to move said frames to carry their knives toward and from the opposite sides of the same comb.

2. In a honey uncapping machine, the combination of a support, a pair of knife-carrying frames having end bars pivoted to the support, a handle bar above the support, and links connecting the handle bar to each end with the end bars of said frame at the same end.

3. In a honey uncapping machine, the combination of cutting means, a frame supporting said cutting means, and a guard to prevent said cutting means engaging the comb frame.

4. In a honey uncapping machine, the combination of cutting means, a comb frame bar engaging device, and means to move said device into and out of engagement with the frame bar.

5. In a honey uncapping machine, the combination of a support, a pair of knife-carrying frames pivotally suspended from said support so as to swing toward and from each other, a handle, and loose connections between said handle and said frames above the pivots of the latter.

6. In a honey uncapping machine, the combination of a support, a pair of knife-carrying frames pivotally suspended from said support so as to swing toward and from each other, a handle, loose connections between said handle and said frames above the pivots of the latter, and comb frame engaging guides mounted on the knife-carrying frames.

7. In a honey uncapping machine, the combination of a support, a pair of knife-carrying frames pivotally suspended from said support so as to swing toward and from each other, a handle, loose connections between said handle and said frames above the pivots of the latter, and rocking comb frame-engaging guides mounted on said knife-carrying frames.

8. In a honey uncapping machine, the combination of a support, and a knife-carrying frame having end bars movably mounted on said support, and said end bars having edges in a plane within the plane of the knives, whereby contact of the knives with the comb frame is prevented.

9. In a honey uncapping machine, the combination of a support, knife-carrying frames mounted on said support, frame bar engaging levers pivoted on said support, and a handle connected with said levers.

10. In a honey uncapping machine, the combination of a support, a knife-carrying frame pivotally connected with said support and comprising vertical end bars, comb frame-engaging guides mounted on said frame and a horizontal knife-supporting bar secured at its ends to said end bars.

11. In a honey uncapping machine, the combination of a support, a pair of knife-carrying frames pivotally suspended from said support, a pair of handles adjacent each other, and a loose connection between one of said handles and said knife-carrying frames.

12. In a honey uncapping machine, the combination of a cutter, and a capping deflector arranged to engage the capping after the cutter has severed the same from the comb.

13. In a honey uncapping machine, the combination of a series of knives, and a bar to which the same are attached having an outward extension forming a capping deflector.

14. In a honey uncapping machine, the combination of a support, a knife-carrying frame movably connected with said support, a handle connected with the knife-carrying frame to move the same to carry the knife toward the side of the comb, and a handle attached to said support to form a grip in connection with the handle attached to the knife-carrying frame.

In testimony that I claim the foregoing I have hereunto set my hand.

LEWIS R. FERGUSON.

Witnesses:
 Thos. J. Phillips,
 Thomas C. Stobbs.

---

Copies of this patent may be obtained for five cents each, by addressing the "Commissioner of Patents, Washington, D. C."